United States Patent
Xiao et al.

(10) Patent No.: US 10,432,059 B2
(45) Date of Patent: Oct. 1, 2019

(54) ELECTRIC ACTUATOR

(71) Applicant: JOHNSON ELECTRIC INTERNATIONAL AG, Murten (CH)

(72) Inventors: Dao Long Xiao, Shenzhen (CN); Jing Xin Shi, Shenzhen (CN); Yuan Feng Liu, Shenzhen (CN); Si Jun Zhao, Shenzhen (CN); Hong Min Wei, Shenzhen (CN); Shu Ze Li, Shenzhen (CN); Bin Liu, Shenzhen (CN); Xiang Chun Duan, Shenzhen (CN); Hui Juan Xing, Shenzhen (CN); Fei Fei Huang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 156 days.

(21) Appl. No.: 15/465,020

(22) Filed: Mar. 21, 2017

(65) Prior Publication Data
US 2017/0279333 A1 Sep. 28, 2017

(30) Foreign Application Priority Data
Mar. 22, 2016 (CN) .......................... 2016 1 0165439

(51) Int. Cl.
*H02K 5/24* (2006.01)
*H02K 5/04* (2006.01)
*H02K 7/10* (2006.01)
*H02K 7/116* (2006.01)

(52) U.S. Cl.
CPC ................. *H02K 5/24* (2013.01); *H02K 5/04* (2013.01); *H02K 7/10* (2013.01); *H02K 7/1166* (2013.01)

(58) Field of Classification Search
CPC .......... H02K 5/04; H02K 7/1166; H02K 7/10; H02K 5/24
USPC ....................... 310/89, 406–410, 413, 91, 51
See application file for complete search history.

(56) References Cited

U.S. PATENT DOCUMENTS

| 5,969,447 A * | 10/1999 | Periyathamby | H02K 5/143 310/51 |
| 6,448,678 B1 * | 9/2002 | Simpson | F04D 29/668 310/51 |
| 6,906,440 B1 * | 6/2005 | Fife | H02K 5/161 310/51 |

(Continued)

FOREIGN PATENT DOCUMENTS

DE 102010028031 A1 * 10/2011 ........... H02K 5/1672

*Primary Examiner* — Naishadh N Desai
(74) *Attorney, Agent, or Firm* — Muncy, Geissler, Olds & Lowe, P.C.

(57) ABSTRACT

An electric actuator includes a motor having a rotary shaft. The electric actuator further includes a vibration damping gasket mounted on the motor. The vibration damping gasket includes an annular body attached around the motor and an end wall formed on one end of the annular body, and the end wall defines a through hole allowing the rotary shaft to pass therethrough. The motor further includes an outer housing, and the annular body of the vibration damping gasket is attached around the outer housing. The end wall of the vibration damping gasket contacts with the end surface of the outer housing. The vibration damping gasket is made from a resilient material. The electric actuator can effectively reduce the mechanical vibration, improve a buffering effect thereof, and hence reduce the noise.

16 Claims, 7 Drawing Sheets

(56) References Cited

U.S. PATENT DOCUMENTS

2015/0015099 A1* 1/2015 Matsuki .................. H02K 1/32
                                                    310/61
2015/0130301 A1* 5/2015 Billman .................. H02K 5/24
                                                    310/51

* cited by examiner

ELECTRIC ACTUATOR

CROSS REFERENCE TO RELATED APPLICATIONS

This non-provisional patent application claims priority under 35 U.S.C. § 119(a) from Patent Application No. 201610165439.9 filed in The People's Republic of China on Mar. 22, 2016.

FIELD OF THE INVENTION

This invention relates to an electric actuator with vibration and noise damping function.

BACKGROUND OF THE INVENTION

An electric actuator is widely used in control of various industrial automation processes, typically in combination with various valves to form electric valves or electric regulating valves such as ball valves, butterfly valves, gate valves, or the like. The actuator utilizes a direct current motor or an alternating current motor as a driving mechanism. During operation of the actuators, the motor generates noise due to mechanical vibration. When the electric actuator is utilized in some applications with high requirement of noise such as in a heating, ventilation and air conditioning apparatus of an office, a library or a heating, the noise caused by the electric actuator can be an extremely severe issue. A current solution to this issue is constructing a noise shield to isolate the whole electric actuator or the motor. Although the isolating shield has the noise isolating effect, this noise damping solution makes the electric actuator more bulky and increases the assembly and manufacturing cost. In addition, an increase of the number of components also leads to an increased failure rate.

SUMMARY OF THE INVENTION

Accordingly, there is a need for an electric actuator capable of damping the vibration and noise.

An electric actuator includes a motor and a vibration damping gasket. The motor includes an outer housing accommodating a stator and a rotor therein and a rotary shaft extending from an end surface of the outer housing. The vibration damping gasket includes an annular body sleeved on outer housing of the motor and an end wall abutting against the end surface of the outer housing from which the rotary shaft extending from. The end wall defining a through hole through which the rotary shaft extends.

Preferably, the end wall is integrally formed at an end of the annular body.

Preferably, the vibration damping gasket is made from a resilient material.

Preferably, the outer housing further comprises a side surface connected with the end surface, and the annular body hoop the side surface of the outer housing.

Preferably, a protruding flange is formed at a center area of the end surface of the outer housing, and the protruding flange defines an axial hole allowing the rotary shaft to pass therethrough.

Preferably, the end wall includes an inner flat surface and an outer flat surface, the inner flat surface contacts with the end surface of the outer housing of the motor.

Preferably, the through hole is bounded by a first straight side, a second straight side, a first curved side, and a second curved side, the first straight side and the second straight side are parallel to and opposed to each other, and the first curved side and the second curved side are opposed to each other and respectively connected between the first straight side and the second straight side.

Preferably, the through hole has a circular shape concentric with an axis of the rotary shaft.

Preferably, the electric actuator is applied in a heating, ventilation and air conditioning apparatus.

Preferably, the electric actuator further comprises a plurality of transmission members directly or indirectly connected to the shaft of the motor.

Preferably, the electric actuator further comprises a case receiving the motor, and the transmission members, the vibration damping gasket resists against an inner surface of the case.

The electric actuator provided by the present invention can effectively reduce the mechanical vibration, improve a buffering effect of the electric actuator, and hence reduce the noise.

Below, embodiments of the present invention will be described in detail with reference to the accompanying drawings.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "connected" to another component, it can be directly connected to the another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
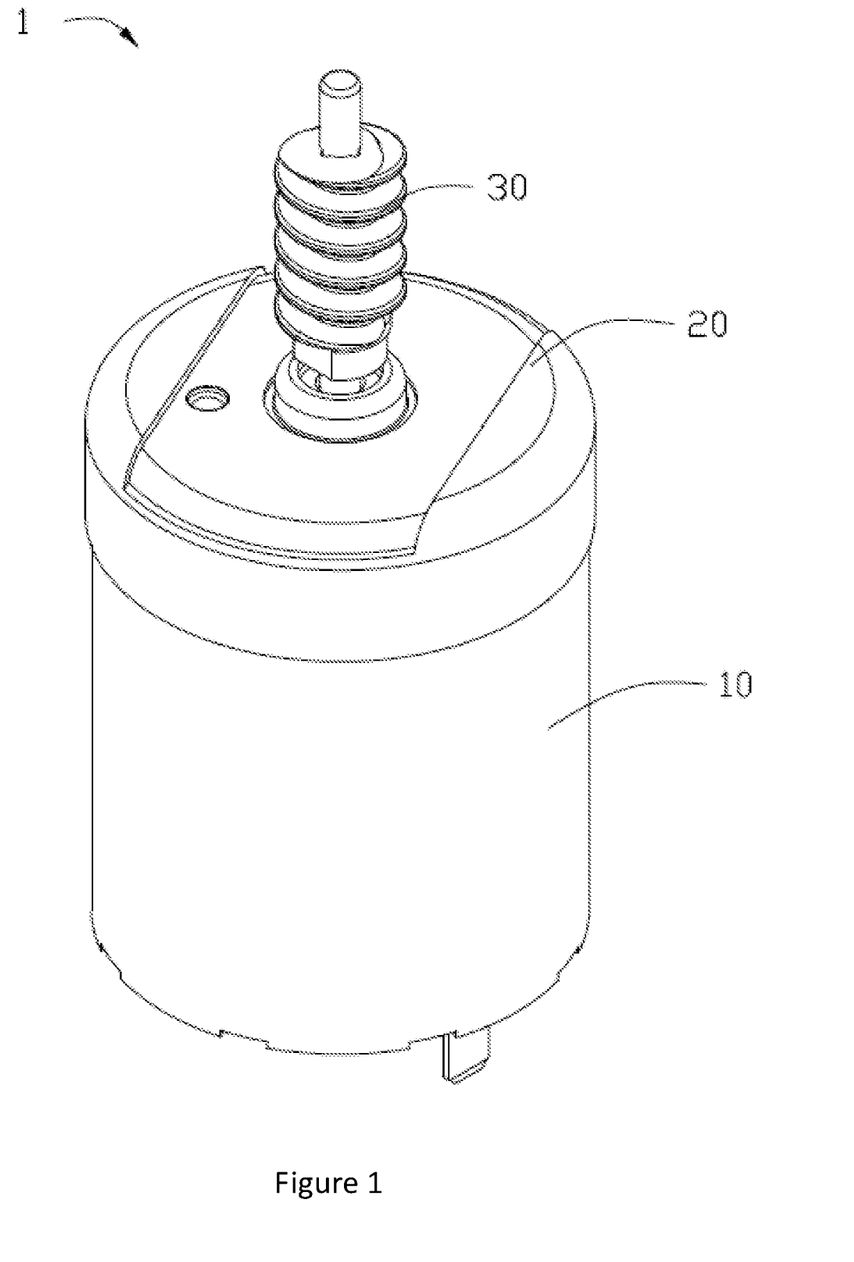
FIG. 1 is a perspective view of a electric actuator according to a first embodiment of the present invention.

Referring to FIG. 1, a preferred embodiment of the present invention provides an electric actuator 1 capable of damping vibration and noise, which is configured to drive an external device (not shown) to rotate or drive an external device to translate through a transmission mechanism (not shown). The external device may be an electrical device such as a communication device or an electric actuator, or a non-electrical device such as a vehicle window, a regulating valve, or a ball valve. In this embodiment, the electric actuator 1 is used in an actuator for a heating, ventilation and air conditioning apparatus, providing a driving force for the actuator. The electric actuator 1 includes a motor 10, a vibration damping gasket 20, and a worm 30. The vibration damping gasket 20 and the worm 30 are disposed on the motor 10.

Figure 2:
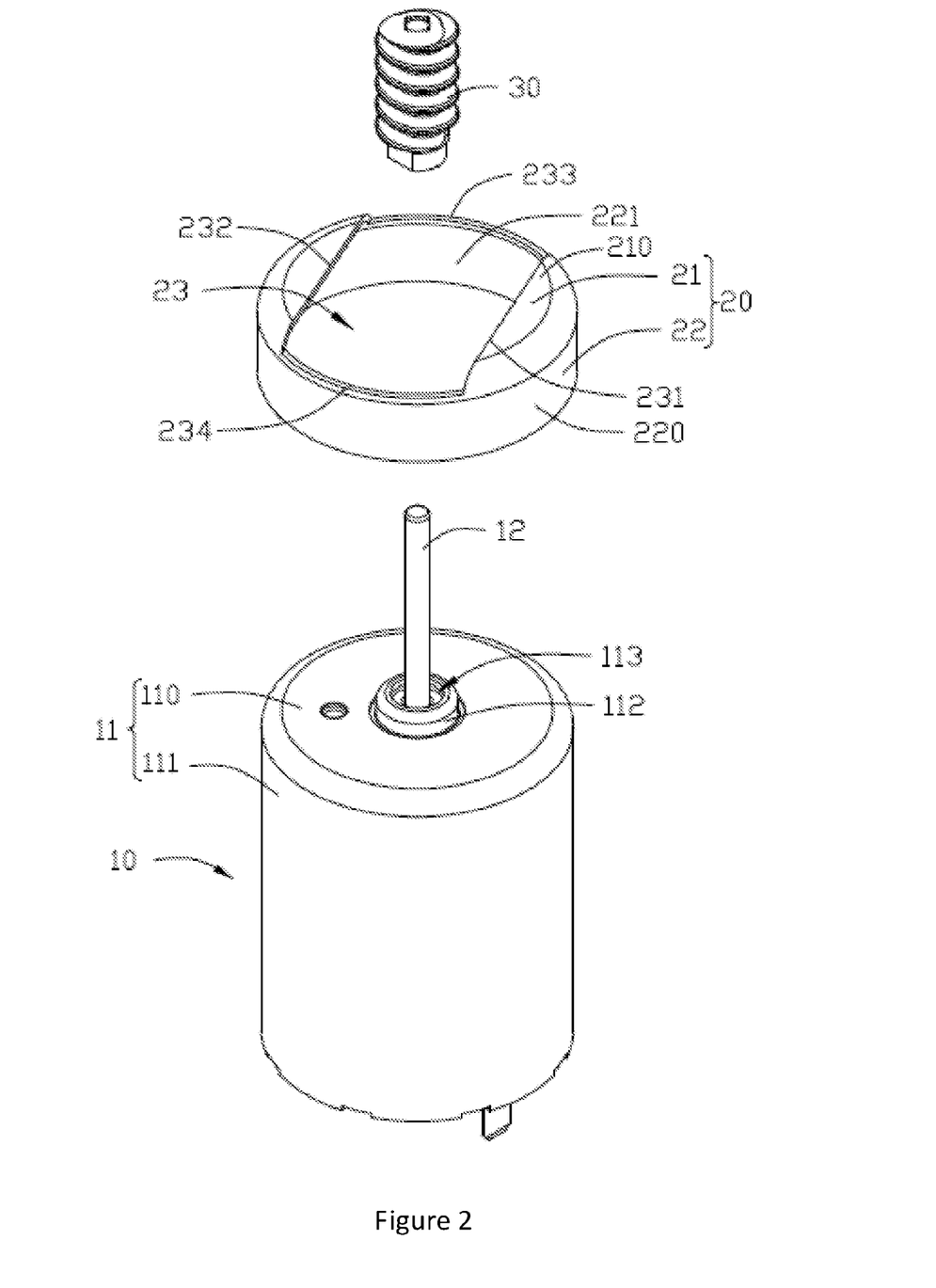
FIG. 2 is a perspective, exploded view of a electric actuator of FIG. 2.

Referring to FIG. 2, the motor 10 includes an outer housing 11 accommodating a rotor and a stator therein and a rotary shaft 12 connected to the rotor and extending from an end of the outer housing 11. The motor 10 can be of any type, such as a direct current motor, an alternating current motor, a synchronous motor or an asynchronous motor. The outer housing 11 includes an end surface 110 and a side surface 111 connected with the end surface 110. The end surface 110 is generally a circular surface. A protruding flange 112 is disposed at a central area of the circular surface. An axial hole 113 is formed in a center of the protruding flange 112. The axial hole 113 is a round hole having a diameter greater than a diameter of the rotary shaft 12. The rotary shaft 12 passes through the axial hole 113. A protruding height, an outer diameter of the protruding flange 112 and the diameter of the axial hole 113 are not intended to be limited to those shown in the figures.

The side surface 11 of the outer housing 11 is generally a cylindrical surface which is connected to an outer edge of the end surface 110.

The vibration damping gasket 20 is used to absorb mechanical vibration of the motor 10 and reduce the operational noise of the electric actuator 1. The vibration damping gasket 20 is sleeved on the outer housing 11 and the motor 10 and allows the rotary shaft 12 to pass therethrough. The worm 30 is attached to the rotary shaft 12 of the motor 10 and configured to transmit a torque of the electric actuator 1 to an external component or an external device.

Figure 3:
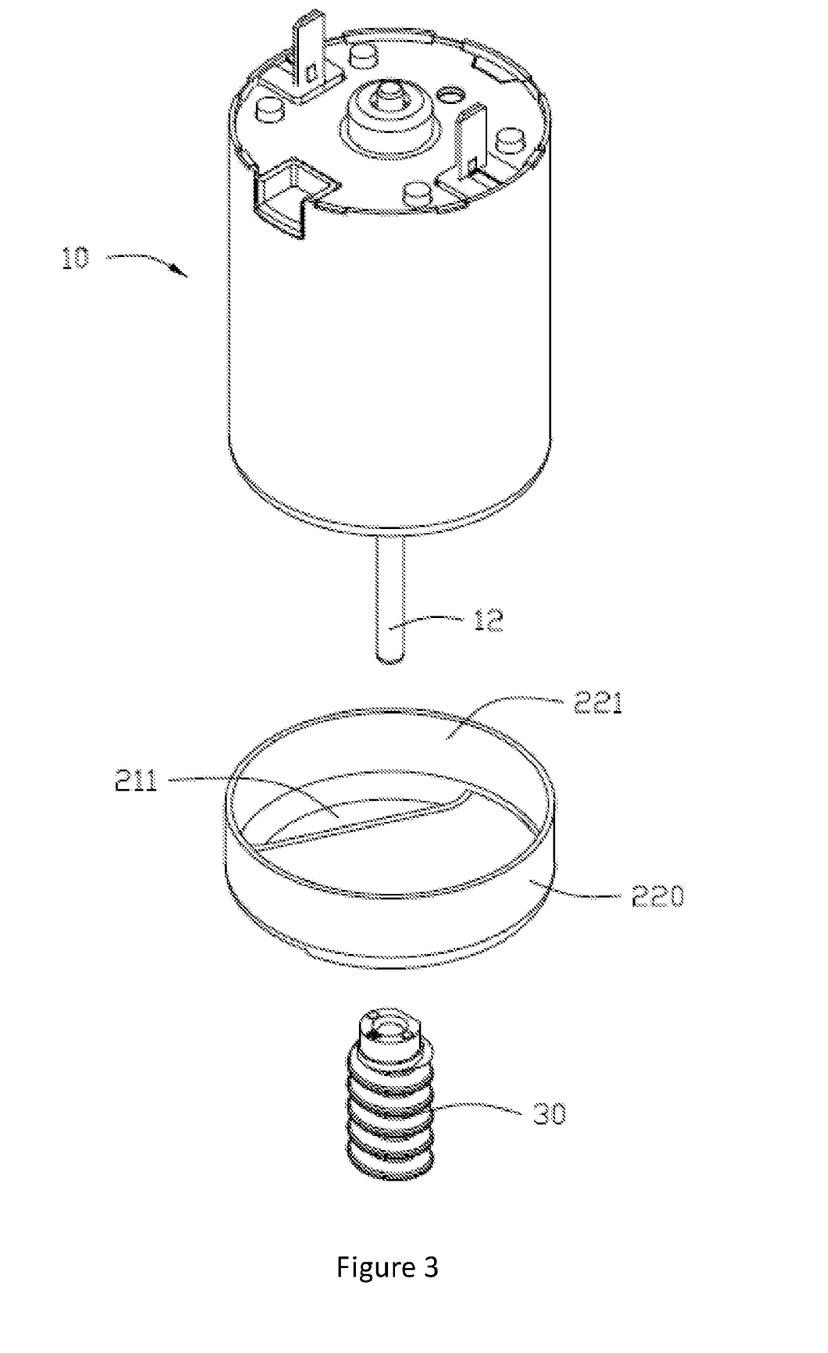
FIG. 3 is a perspective, exploded view of the electric actuator of FIG. 1, viewed from another aspect.

Referring to FIG. 2 and FIG. 3, the vibration damping gasket 20 is made from a resilient material, including an annular body 22 and an end wall 21 integrally formed with the annular body 22. The end wall 21 is generally perpendicular to an axis of the annular body 22. The annular body 22 includes an outer cylindrical surface 220 and an inner cylindrical surface 221. A diameter of the inner cylindrical surface 221 is substantially equal to or slightly less than an outer diameter of a side surface 111 of the motor 10. With a radial expansion of the inner cylindrical surface 221, the annular body 22 tightly hoops the side surface 111 of the motor 10, thereby attaching the vibration gasket 20 to the outer housing 11 of the motor 10. In order to ensure stable engagement between the annular body 22 and the side surface 111 of the motor 10, an axial length of the annular body 22 should not be too short. For example, an axial length of the annular body 22 may be greater than 10% of an axial length of the side surface 111 of the motor 10.

The end wall 21 of the vibration damping gasket 20 includes an outer flat surface 210 and an inner flat surface 211. The inner flat surface 211 is connected with the inner cylindrical surface 221 of the annular body 22, the outer flat surface 210 is connected with the outer cylindrical surface 220 of the annular body 22, and the inner flat surface 211 contacts the end surface 110 of the motor 10.

The end wall 21 defines a through hole 23 for allowing the rotary shaft 12 to pass therethrough. The through hole 23 is cooperatively bounded by a first straight side 231, a second straight side 232, a first curved side 233, and a second curved side 234. The first straight side 231 and the second straight side 232 are parallel to each other. The first curved side 233 and the second curved side 234 are opposed to each other. The first curved side 233 and the second curved side 234 are both aligned with an outer edge of the side surface 111, and are symmetrical with respect to an axis of the rotary shaft 12. A hypothetical circular surface formed by the first curved side 233 and the second curved side 234 is parallel to or overlaps with the end surface 110 of the motor 10. A distance between the first straight side 231 and the second straight side 232 is not intended to be limited to that shown in the figures, as long as it is greater than or equal to a diameter of the rotary shaft 12.

The electric actuator 1 of this embodiment achieves good vibration damping effect, experimental data of which is shown in Table 1 below. Table 1 lists several groups of noise comparison parameters between situations where the vibration damping gasket is used and is not used. The results show that the use of the electric actuator of this embodiment can reduce the noise.

TABLE 1

Sound Pressure Level of Electric actuator With Vibration Damping Gasket And Electric actuator Without Vibration Damping Gasket (Unit: dB)

| No. | Without Vibration Damping Gasket | | With Vibration Damping Gasket | |
| --- | --- | --- | --- | --- |
| | Forward Rotation | Reverse Rotation | Forward Rotation | Reverse Rotation |
| 1 | 35.3 | 35.7 | 33.8 | 34.4 |
| 3 | 34.7 | 33.5 | 33.3 | 32.8 |
| 4 | 34.3 | 34.2 | 33.4 | 33.4 |
| 5 | 35.2 | 34.0 | 33.0 | 33.4 |
| 6 | 35.2 | 34.6 | 33.6 | 32.6 |
| 8 | 33.3 | 33.2 | 32.6 | 32.7 |
| 9 | 34.3 | 34.6 | 32.4 | 33.8 |
| 10 | 33.5 | 34.2 | 33.3 | 32.9 |
| 11 | 35.9 | 35.1 | 34.8 | 33.7 |
| 12 | 34.3 | 34.7 | 34.1 | 33.9 |
| Average | 34.6 | 34.4 | 33.4 | 33.4 |

Figure 4:
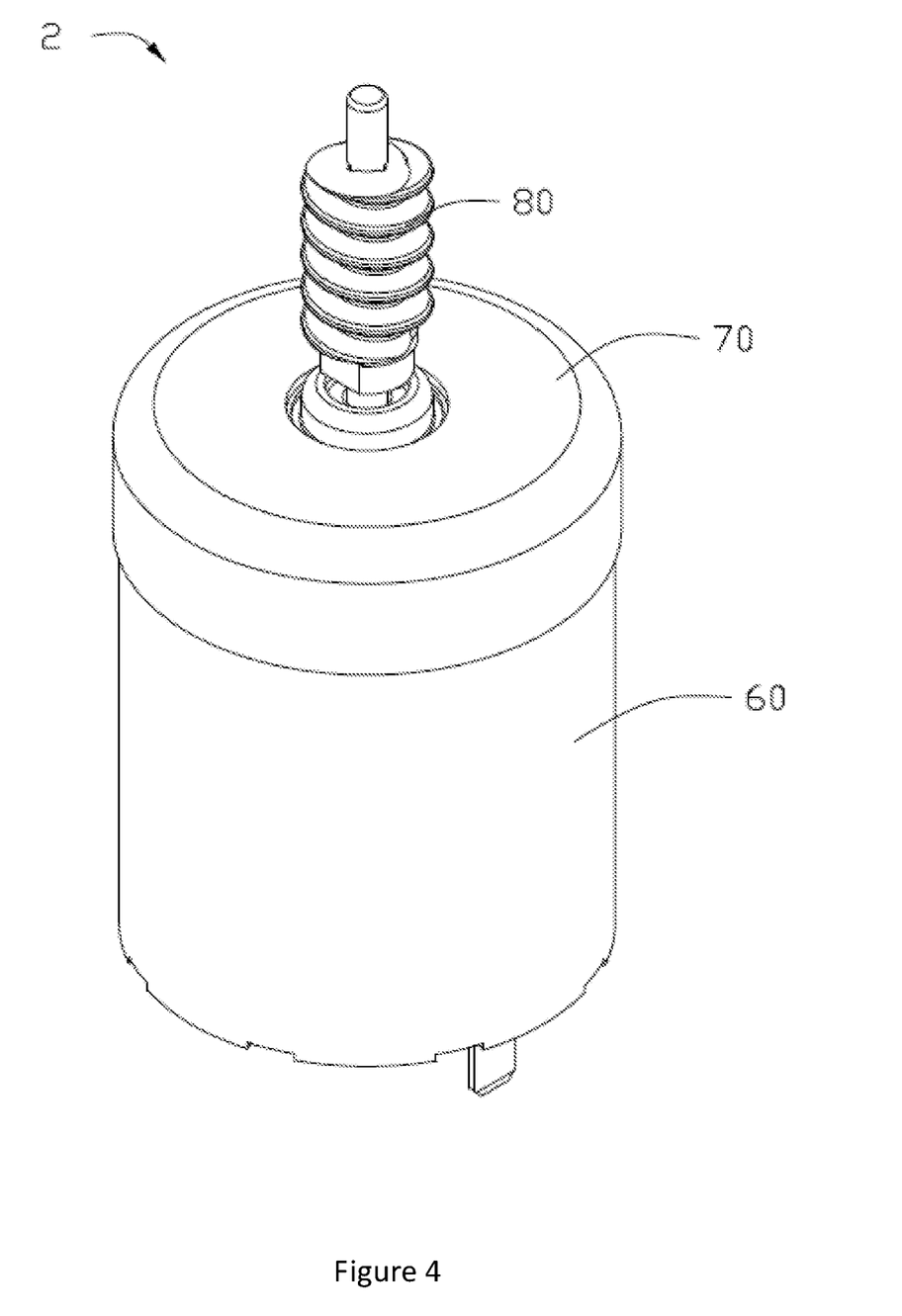
FIG. 4 is a perspective, exploded view of the electric actuator according to a second embodiment of the present invention.

Referring to FIG. 4, an electric actuator 2 according to a second embodiment of the present invention includes a motor 60, a vibration damping gasket 70, and a worm 80. The vibration damping gasket 70 and worm 80 are both disposed on the motor 60. The motor 60 has the same features as in the motor 10 of the first embodiment, the worm 80 has the same features as in the worm 30 of the first embodiment, and further explanations thereof are not repeated herein.

Figure 5:
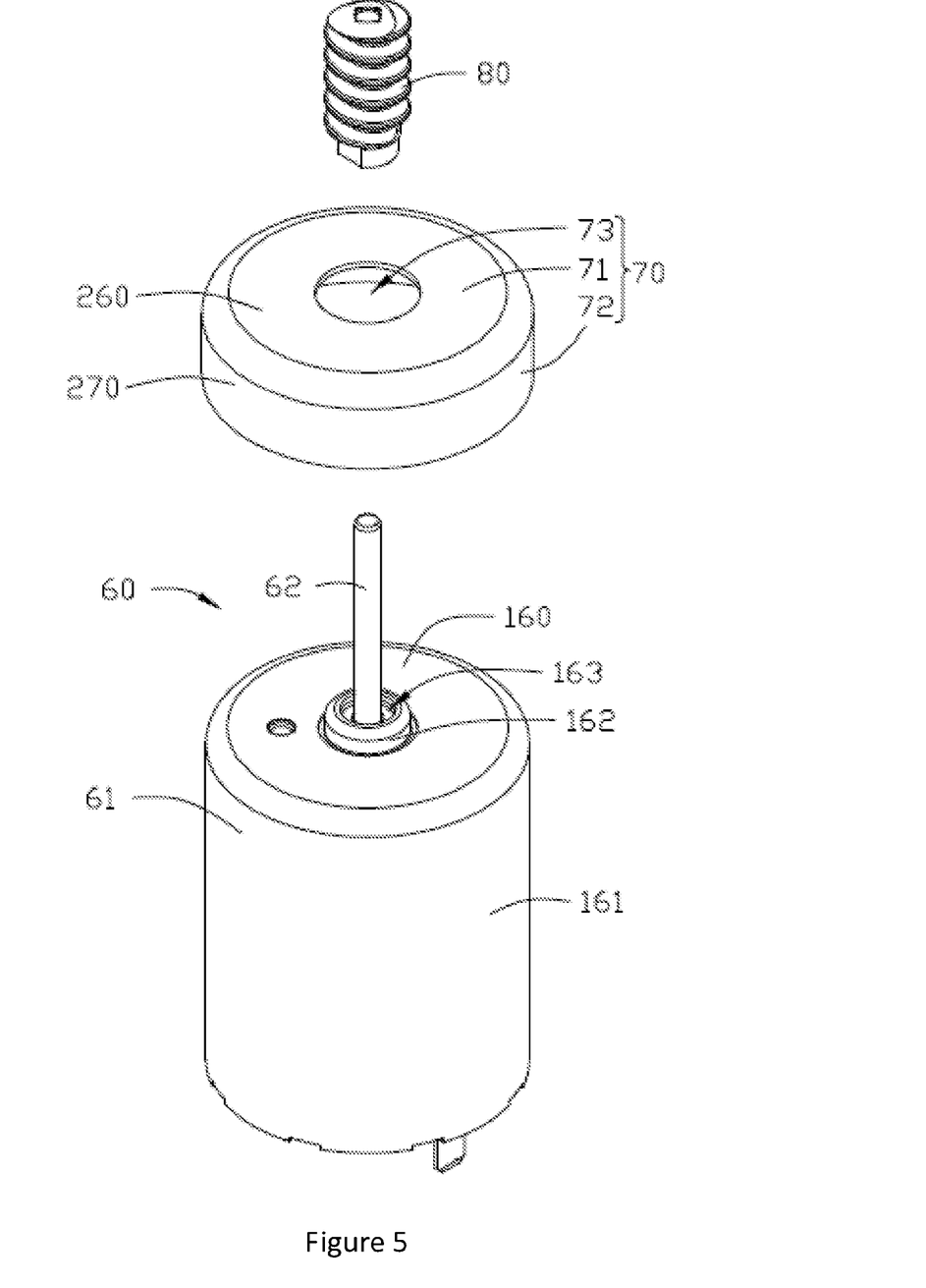
FIG. 5 is a perspective, exploded view of the electric actuator of FIG. 4.
Figure 6:
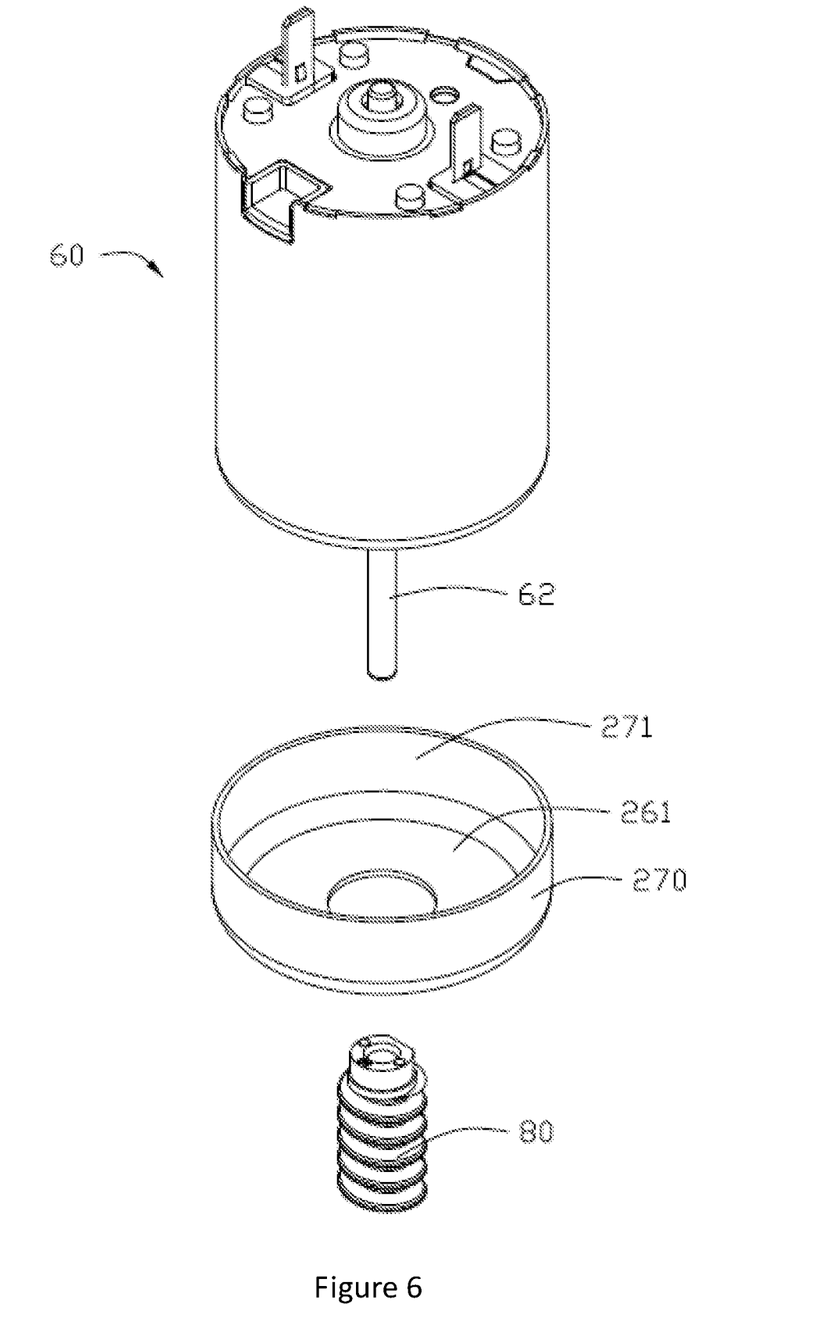
FIG. 6 is a perspective, exploded view of the electric actuator of FIG. 4, viewed from another aspect.

Referring to FIG. 5 and FIG. 6, the vibration damping gasket 70 is made from a resilient material, including an annular body 72 and an end wall 71 connected with the annular body 72. The annular body 72 has the same features as in the first embodiment of the annular body 22 and, therefore, further explanations thereof are not repeated herein.

The end wall 71 of the vibration damping gasket 70 defines a through hole 73 for allowing the rotary shaft 62 to pass therethrough. The through hole 73 has a circular shape with a circle center aligned with the axis of the rotary shaft 62. A diameter of the through hole 73 is greater than the diameter of the rotary shaft. In other embodiments, the diameter of the through hole 73 is not intended to be limited to the size shown in the figures. The electric actuator 2 of this embodiment can likewise achieve the vibration damping effect.

Figure 7:
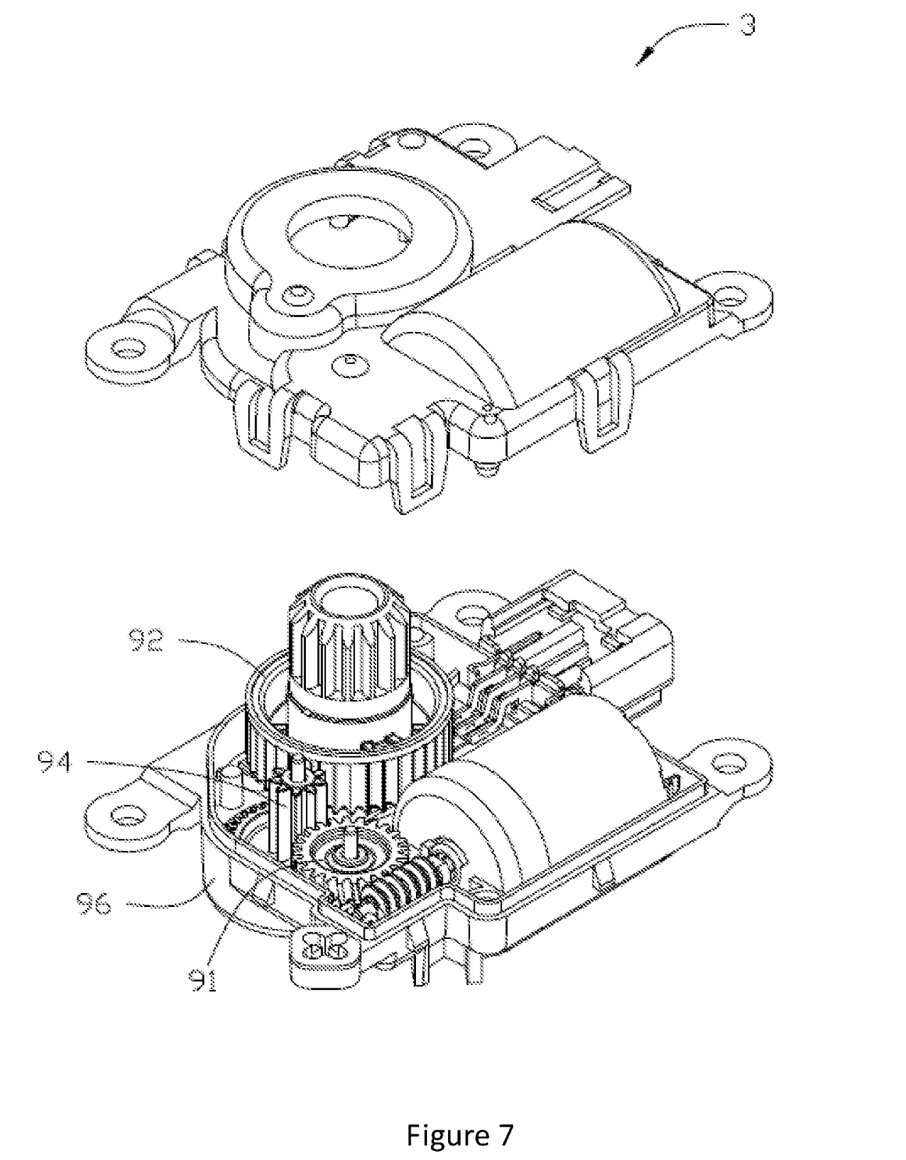
FIG. 7 is a perspective, exploded view of a electric actuator according to a third embodiment of the present invention.

Referring to FIG. 7, in addition to including the motor, the vibration damping gasket and the worm as in first embodiment or the second embodiment, an electric actuator 3 according to a third embodiment of the present invention further includes two transmission members 91, 92 respectively disposed at an axial side and a radial side of the vibration damping gasket, a transmission member 94 connecting the two transmission members 91, 92, and a case 96 receiving the motor 60, the vibration damping gasket 70 or 71, and the worm and transmission members 91, 92, 94. The vibration damping gasket 70 or 71 resists against an inner surface of the case 96 to damp the vibration generated by the motor 60 from transferring to the case 96. In other embodiments, the transmission member 94 may be omitted, in which case the transmission member 91 may be directly connected with the transmission member 92.

The transmission member 91 is disposed at the axial side of the vibration damping gasket, i.e. at one side of the end wall of the vibration damping gasket. The transmission member 92 is disposed at the radial side of the vibration damping gasket, i.e. at one side of the annular body of the vibration damping gasket. While the transmission members 91, 92, 94 are gears in this embodiment, they can be in another form, such as, of a screw lever, a chain, a pulley, or the like, in other embodiments.

In other embodiment, the transmission member may be disposed at only the radial side or axial side of the vibration damping gasket. Alternatively, a portion of the transmission member is disposed at the radial side of the vibration damping gasket, and another portion of the same transmission member is disposed at the axial side of the vibration damping gasket.

Because the vibration damping gasket includes the annular body and the end wall attached around the motor, the vibration damping gasket can damp the vibration from both the axial direction and the radial direction, which enhances the vibration damping effect.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. An electric actuator comprising:
a motor comprising an outer housing accommodating a stator and a rotor therein and a rotary shaft extending from an end surface of the outer housing; and
a vibration damping gasket made from a resilient material which is attached to the motor, the vibration damping gasket comprising an annular body sleeved on the outer housing of the motor and an end wall abutting against the end surface of the outer housing from which the rotary shaft extends from, the end wall defining a through hole through which the rotary shaft extends; and wherein
the annular body of vibration damping gasket comprises an inner cylindrical surface which expands radially and tightly hoops a side surface of the outer housing, and the end wall of the vibration damping gasket comprises an inner flat surface directly contacted the end surface of the outer housing.

2. The electric actuator of claim 1, wherein the end wall is integrally formed at an end of the annular body.

3. The electric actuator of claim 1, wherein a protruding flange is formed at a center area of the end surface of the outer housing, and the protruding flange defines an axial hole allowing the rotary shaft to pass therethrough.

4. The electric actuator of claim 1, wherein the end wall comprises the inner flat surface and an outer flat surface, the inner flat surface contacts with the end surface of the outer housing of the motor.

5. The electric actuator of claim 1, wherein the through hole is bounded by a first straight side, a second straight side, a first curved side, and a second curved side, the first straight side and the second straight side are parallel to and opposed to each other, and the first curved side and the second curved side are opposed to each other and respectively connected between the first straight side and the second straight side.

6. The electric actuator of claim 1, wherein the through hole has a circular shape concentric with an axis of the rotary shaft.

7. The electric actuator of claim 1, wherein the electric actuator is applied in a heating, ventilation and air conditioning apparatus.

8. The electric actuator of claim 1, wherein the electric actuator further comprises a plurality of transmission members directly or indirectly connected to the shaft of the motor.

9. The electric actuator of claim 8, wherein the electric actuator further comprises a case receiving the motor, and two transmission members respectively disposed at an axial side and a radial side of the vibration damping gasket and connected to the rotary shaft, the vibration damping gasket resists against an inner surface of the case.

10. The electric actuator of claim 1, wherein a diameter of the inner cylindrical surface of the annular body of the vibration damping gasket is equal to or slightly less than an outer diameter of the side surface of the outer housing.

11. The electric actuator of claim 1, wherein an axial length of the annular body is greater than 10% of an axial length of the side surface of the outer housing.

12. An electric actuator comprising:
a motor comprising an outer housing , a rotary shaft extending from an end surface of the outer housing, and a worm attached to the rotary shaft;
a vibration damping gasket made from a resilient material which is attached to the motor, the vibration damping gasket comprising an annular body, an end wall integrally formed with the annular body and a through hole defined on the end wall passed through by the rotary shaft, the end wall being perpendicular to an axis of the annular body; and wherein
a diameter of the inner cylindrical surface of the annular body is equal to or slightly less than an outer diameter of the side surface of the outer housing;
the annular body of vibration damping gasket comprises an inner cylindrical surface which expands radially and tightly hoops a side surface of the outer housing , and the end wall of the vibration damping gasket comprises an inner flat surface directly contacted the end surface of the outer housing.

13. The electric actuator of claim 12, wherein an axial length of the annular body is greater than 10% of an axial length of the side surface of the outer housing.

14. The electric actuator of claim 12, wherein the through hole is bounded by a first straight side, a second straight side, a first curved side, and a second curved side, the first straight side and the second straight side are parallel to and opposed to each other, and the first curved side and the second curved side are opposed to each other and respectively connected between the first straight side and the second straight side.

15. The electric actuator of claim 12, wherein the electric actuator further comprises a case receiving the motor, and two transmission members respectively disposed at an axial side and a radial side of the vibration damping gasket and connected to the worm, and the vibration damping gasket resists against an inner surface of the case.

16. The electric actuator of claim 15, wherein the through hole is bounded by a first straight side, a second straight side, a first curved side, and a second curved side, the first straight side and the second straight side are parallel to and opposed to each other, and the first curved side and the second curved side are opposed to each other and respectively connected between the first straight side and the second straight side.

* * * * *